United States Patent [19]
Ferrante

[11] Patent Number: 5,724,189
[45] Date of Patent: Mar. 3, 1998

[54] METHODS AND APPARATUS FOR CREATING AN ASPHERIC OPTICAL ELEMENT AND THE ASPHERIC OPTICAL ELEMENTS FORMED THEREBY

[75] Inventor: Ronald A. Ferrante, St. Charles, Mo.

[73] Assignee: McDonnell Douglas Corporation, St. Louis, Mo.

[21] Appl. No.: 573,481

[22] Filed: Dec. 15, 1995

[51] Int. Cl.⁶ .................................................. G02B 27/14
[52] U.S. Cl. .......................... 359/634; 359/630; 359/631
[58] Field of Search .......................... 359/634, 71, 630, 359/631; 345/7, 8, 9; 348/782, 783, 784

[56] References Cited

U.S. PATENT DOCUMENTS

| | | | |
|---|---|---|---|
| Re. 32,849 | 1/1989 | Wei et al. | 204/192.27 |
| 4,260,466 | 4/1981 | Shirahata et al. | 204/192 |
| 4,669,810 | 6/1987 | Wood | 340/908 |
| 4,776,868 | 10/1988 | Trotter, Jr. et al. | 65/18.2 |
| 4,826,287 | 5/1989 | Cook et al. | 345/7 |
| 4,968,117 | 11/1990 | Chern et al. | 359/573 |
| 5,009,485 | 4/1991 | Hall | 359/586 |
| 5,011,244 | 4/1991 | Smith et al. | 359/15 |
| 5,194,989 | 3/1993 | Ferrante et al. | 359/583 |
| 5,249,081 | 9/1993 | Rogers | 359/633 |
| 5,293,269 | 3/1994 | Burkhart et al. | 359/719 |
| 5,411,772 | 5/1995 | Cheung | 427/586 |
| 5,576,886 | 11/1996 | Ferrante | 359/630 |

OTHER PUBLICATIONS

Richard L. Fisher, Design methods for a holographic head-up display curved combiner, *Optical Engineering*, vol. 28, No. 6, Jun. 1989.

*Primary Examiner*—David C. Nelms
*Assistant Examiner*—Ricky Mack
*Attorney, Agent, or Firm*—The Bell Seltzer Intellectual Property Law Group Of Alston & Bird LLP

[57] ABSTRACT

A method and apparatus for coating optical substrates, such as a combiner substrate, is provided so as to create aspheric optical elements, such as aspheric combiners for heads up displays. Due to its asphericity, the aspheric optical element, such as an aspheric combiner, can compensate or correct for optical aberrations within an optical system, such as a heads up display. However, the coating method and apparatus of the present invention allows aspheric optical elements, including aspheric combiners, to be repeatedly fabricated in a less expensive manner. The coating apparatus includes a fixture for holding an optical substrate, such as a combiner substrate, in a predetermined aligned relation with a mask. The mask defines an opening having a predetermined shape which varies in at least one radial direction and through which a portion of the optical substrate is exposed. By creating a relative rotation between the mask and the optical substrate, an aspheric dielectric layer can be deposited on the substrate, such as via ion assisted deposition, which has a thickness which varies in a predetermined manner along at least one radial direction in correspondence to the predetermined shape of the opening defined by the mask. In order to create an aspheric combiner, a reflection coating can then be deposited upon the aspheric dielectric coating to reflect visual images provided by a cathode ray tube of the heads up display to the pilot without undesirable aberrations.

44 Claims, 3 Drawing Sheets

METHODS AND APPARATUS FOR CREATING AN ASPHERIC OPTICAL ELEMENT AND THE ASPHERIC OPTICAL ELEMENTS FORMED THEREBY

GOVERNMENT RIGHTS

The United States Government may have rights in this invention pursuant to a contract awarded by the Department of the Air Force.

FIELD OF THE INVENTION

This invention relates generally to methods and apparatus for creating aspheric optical elements and the aspheric optical elements formed thereby and, more particularly, to methods and apparatus for creating an aspheric combiner of a heads up display and the aspheric combiners formed thereby.

BACKGROUND OF THE INVENTION

The heads up display of modern aircraft performs one of the most critical and complex avionics functions by unobtrusively displaying visual data for the pilot to review, while the pilot continues to view the outside world through the windscreen. Typically, the visual data displayed by the heads up display is generated by a high-brightness cathode ray tube. The visual data, such as symbolic and alphanumeric data, is projected through a relay lens system to a beam folding mirror which reflects the visual data, typically through a projection lens, onto a transparent combiner.

The combiner is located between the pilot and the windscreen of the aircraft and is designed to at least partially reflect the visual data displayed by the cathode ray tube, while continuing to afford the pilot a virtually unobstructed view of the outside world through the combiner and the windscreen. In order to increase the pilot's field of view through the combiner, such as from about 15° to about 30°, conventional combiners are curved. For example, one conventional combiner defines a radius of about 650 cm. The combiner is also generally tilted or angled, such as by about 30° to about 40°, from vertical to reflect the upwardly projected visual data to the pilot. This tilting of the combiner introduces a number of optical aberrations into the heads up display which distorts the visual data presented to the pilot.

In order to correct for at least some of the optical aberrations within the heads up display, complex relay optics and aspheric beam folding mirrors have been developed which essentially distort the visual data projected by the cathode ray tube in such a manner that the optical aberrations introduced by the combiner will correct or compensate for those distortions and provide a relatively clear display of both the visual data projected by the cathode ray tube and the outside world for the pilot. However, such complex relay optics and aspheric beam folding mirror are relatively expensive and require use of sophisticated processing techniques in order to appropriately distort the visual data projected by the cathode ray tube and compensate for the optical aberrations introduced by the tilted combiner.

In order to compensate or correct for optical aberrations within the heads up display, including aberrations introduced by the tilting of the combiner, holographic combiners have been developed which include dichromated gelatin holographic thin films as the active combiner material. See, for example, U.S. Pat. No. 4,669,810 to Robert B. Wood and an article by Richard L. Fisher entitled "Design Methods For A Holographic Head-Up Display Curved Combiner" published in Optical Engineering, Vol. 28, No. 6, pp. 616–21 (June 1989). In holographic combiners, a holographic thin film is typically deposited upon a glass substrate. The holographic film generally includes one or more layers of photosensitive gelatin which have been exposed by a holographic process in order to record a holographic fringe pattern and which have subsequently been developed, such as by wet chemical processing.

Dichromated gelatin holographic thin films are generally difficult to fabricate, however, and can require relatively large capital investments and long periods of training for the manufacturing personnel. Thus, the number of suppliers of holographic combiners is limited and the resulting cost of the holographic combiners is prohibitively expensive.

In addition, holographic combiners must also generally include a glass cover plate to protect the dichromated gelatin holographic thin films. In particular, a pair of relatively heavy cover glass plates are typically cemented, such as with protective cement thin film layers, to opposite sides of the holographic combiner and are circumferentially sealed to protect the relatively fragile gelatin thin films from mechanical abrasion and environmental or moisture damage.

The protective cement thin film layers of a conventional holographic combiner which secure the cover glass plates thereto may also tend to delaminate due to the differing coefficients of expansion of the various components of the holographic combiner. Thus, as a holographic combiner is subjected to varying thermal conditions, the protective cement thin film layers and the various combiner components will expand or shrink to varying degrees, thereby creating delaminations of the protective cement thin film layers. As will be apparent to those skilled in the art, delaminations of the protective cement thin film layers can significantly impair the performance and/or lifetime of a holographic combiner.

Holographic combiners can also exhibit flare. As known to those skilled in the art, optical noise captured during the holographic recording process can produce extraneous diffraction or flare, thereby reducing the visual acuity of the holographic combiner. As a result, points of light, such as the beams from airport runway lights, may be diffracted when viewed through a holographic combiner so as to produce multiple images of the light sources. Under certain conditions, such as in night landings, substantial portions of the pilot's field of view may therefore be obscured by flare from the runway lights.

In addition to holographic combiners, other types of combiners have also been developed for use in heads up display systems. For example, dielectric combiners have been developed in which one or more thin dielectric films are deposited upon a substrate. However, these dielectric combiners generally fail to adequately correct for optical aberrations within the heads-up display, such as aberrations introduced by the tilting of the combiner instead, a heads up display incorporating such a dielectric combiner would typically require a relatively expensive aspheric combiner substrate and/or an aspheric beam folding mirror in order to compensate for the optical aberrations therein.

For example, in order to increase the relative power of the combiner and to correct for at least some of the optical aberrations within the heads up display, an aspheric combiner has been developed as described in U.S. Pat. No. 4,968,117 to Mao-Jin Chern, et al. The aspheric combiner of the Chern '117 patent describes a combiner having a substrate with at least one aspheric surface on which a reflective coating, such as a graded index coating, is formed. Typically, the asphericity of the substrate's surface is selected to compensate or balance for optical aberrations. As described above in conjunction with the complex relay optics and aspheric beam folding mirrors, however, the fabrication of aspheric optical elements, such as aspheric substrates, is typically relatively complicated and, correspondingly, relatively expensive, and often requires multiple grinding and polishing operations which must be precisely controlled.

SUMMARY OF THE INVENTION

It is therefore an object of the present invention to provide an improved method and apparatus for creating aspheric optical elements, such as aspheric relay lenses and aspheric combiners.

It is another object of the present invention to provide a less expensive method and apparatus for fabricating aspheric optical elements, such as aspheric relay lenses and aspheric combiners.

It is still another object of the present invention to provide a less expensive dielectric combiner for a heads up display.

It is a further object of the present invention to provide an improved dielectric combiner for compensating or correcting for optical aberrations within a heads up display.

These and other objects are provided, according to the present invention, by a method and apparatus for coating an optical substrate, such as a combiner substrate, to create an aspheric optical element, such as an aspheric combiner for a heads up display. Due to its asphericity, the aspheric combiner can compensate or correct for optical aberrations within the heads up display. However, the coating method and apparatus of the present invention allows aspheric optical elements, including aspheric combiners, to be repeatedly fabricated in a less expensive manner.

According to one aspect of the present invention, the coating apparatus includes a fixture for holding or positioning the optical substrate in a predetermined aligned relation to a mask. The mask defines an opening having a predetermined shape through which a portion of the optical substrate is exposed. In order to create an aspheric dielectric layer according to the method described below, the opening defined by the mask has a predetermined shape which varies in at least one radial direction. The coating apparatus also includes rotation means for creating a relative rotation between the mask and the combiner during the deposition of the aspheric dielectric layer. For example, the rotation means can rotate the mask, the optical substrate or both the mask and the optical substrate.

The coating apparatus also includes deposition means for depositing the aspheric dielectric layer on the portion of the optical substrate exposed by the opening defined by the mask while the mask and the optical substrate continue their relative rotation. In one embodiment, the aspheric dielectric layer is deposited according to ion assisted deposition. Accordingly, the deposition means of this embodiment can include a target material and an ion source for bombarding the target material with a beam of ions to thereby sputter molecules of the target material on the exposed portion of the optical substrate. In order to effectively coat the optical substrate, the mask, fixture and deposition means can be disposed within a vacuum chamber which is in fluid communication with pump means for reducing the pressure therein while the aspheric dielectric layer is deposited upon the optical substrate.

The deposition of the aspheric dielectric layer is typically completed within a predetermined deposition period according to the coating method described above. In order to form a rotationally symmetric aspheric dielectric layer, the mask and the optical substrate preferably rotate or revolve a number of times, such as at least 50 revolutions, relative to each other during the predetermined deposition period. The coating method and apparatus of the present invention can also form aspheric optical elements, such as aspheric combines, which are not rotationally symmetric. For example, the optical substrate can be mounted or disposed within a carrier during the deposition process so as to be off-center with the mask. Upon completion of the deposition process, the coated optical element can be removed from the carrier to provide an aspheric optical element which is not rotationally symmetric.

According to the coating method and apparatus of the present invention, an aspheric optical element, such as an aspheric relay lens or an aspheric combiner, can be readily fabricated from a relatively inexpensive substrate, such as a spherical glass substrate. By coating the substrate with an aspheric dielectric layer, however, the resulting aspheric optical element, such as an aspheric relay lens or an aspheric combiner, can correct or compensate for optical aberrations within an optical system, such as a heads up display.

According to another aspect of the present invention, an aspheric optical element, such as an aspheric combiner, is provided which includes an aspheric dielectric layer having a thickness which varies in a radial direction in correspondence to the predetermined shape of the opening defined by the mask. According to one embodiment, the aspheric optical element includes a number of aspheric dielectric layers which are deposited on the exposed portion of the optical substrate to create a composite aspheric dielectric layer having a thickness which varies in a radial direction. The optical substrate and the aspheric dielectric layer also have first and second predetermined indices of refraction, respectively, which preferably vary by no greater than 10% to reduce undesirable reflection loss. For example, the optical substrate can be formed of BK-7 optical glass and the aspheric dielectric layer can be formed of silica $SiO_2$.

In many instances, the aspheric optical element is an aspheric combiner which also includes a reflection coating, such as a narrow band reflection coating, deposited on the aspheric dielectric layer. The reflection coating has at least one dielectric layer which at least partially reflects light having a wavelength within the predetermined range of wavelengths of light emitted by the cathode ray tube of the heads up display. Thus, the resulting aspheric combiner can reflect light of the wavelength displayed by the cathode ray tube of the heads up display. According to one embodiment, the reflection coating is formed of first and second dielectric layers having first and second indices of refraction, respectively. In order to properly reflect light of the desired wavelength, the first and second dielectric layers are preferably formed of different materials, such as $ZrO_2$ and $TiO_2$, having different indices of refraction.

Therefore, the coating method and associated apparatus of the present invention can create aspheric optical elements, such as aspheric relay lenses and aspheric combiners for heads up displays, in a less expensive manner from relatively inexpensive optical substrates, such as spherical substrates. As a result, the aspheric combiner of the present invention is less expensive to fabricate. However, the aspheric combiner of the present invention can correct or compensate for optical aberrations within a heads up display, in addition to at least partially reflecting the visual data displayed by the cathode ray tube and allowing the pilot a virtually unobstructed view of the outside world.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
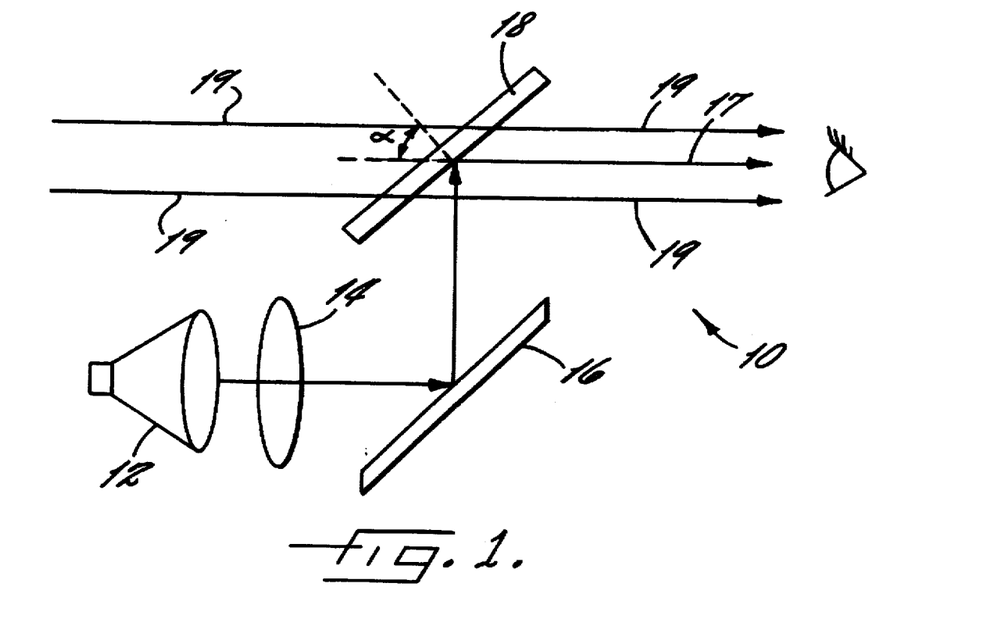
FIG. 1 is a simplified diagrammatic side-view of a heads up display including an aspheric combiner of one embodiment of the present invention.

Referring now to FIG. 1, a heads up display system 10, such as the heads up display within an aircraft, is illustrated. The heads up display generally includes a cathode ray tube 12, relay optics, such as a set of relay lenses 14, a beam folding mirror 16 and a combiner 18. The heads up display can also include a projection lens disposed between the beam folding mirror and the combiner.

As known to those skilled in the art, the cathode ray tube 12 displays or generates an image, typically comprised of visual alphanumeric and symbolic data, to be presented upon the combiner 18 for the pilot to reference as the pilot continues to view the outside world. The cathode ray tube generally emits light of a predetermined range or band of wavelengths. For example, a P-53 cathode ray tube produces relatively bright light within a narrow band of wavelengths. However, other types of cathode ray tubes can be employed without departing from the spirit and scope of the present invention. In addition, the design and fabrication of the relay lenses 14 to properly image the output of the cathode ray tube is well known to those skilled in the art and is described in U.S. Pat. No. 4,763,990.

The combiner 18 is therefore preferably designed to at least partially reflect light having a wavelength within the predetermined range of wavelengths of light emitted by the cathode ray tube 12. Thus, the combiner can present the pilot with an image of the visual data displayed by the cathode ray tube. The image presented by the combiner, including the symbolic and alphanumeric visual data displayed by the cathode ray tube, is then superimposed upon the forward field of view of the pilot through the windscreen. The image reflected by the combiner preferably appears to the pilot to be focused at infinity so that the pilot need not refocus his eyes to see the view of either the outside world, as indicated by light rays 19, or the superimposed images, as indicated by light ray 17.

While the combiner 18 is illustrated in FIG. 1 as a relatively flat plate, the combiner of the present invention has an aspheric shape, as shown in cross-section in FIG. 2 and as described in detail below, in order to correct or compensate for optical aberrations within the heads up display 10. For example, the combiner can correct for optical aberrations introduced by the components of the heads up display, such as the relay optics 14 or the beam folding mirror 16, or for optical aberrations created as a result of tilting the combiner forward by an angle designated α in FIG. 1. Typically, the combiner is tilted forward at an angle α between about 30° and about 40°.

Figure 2:
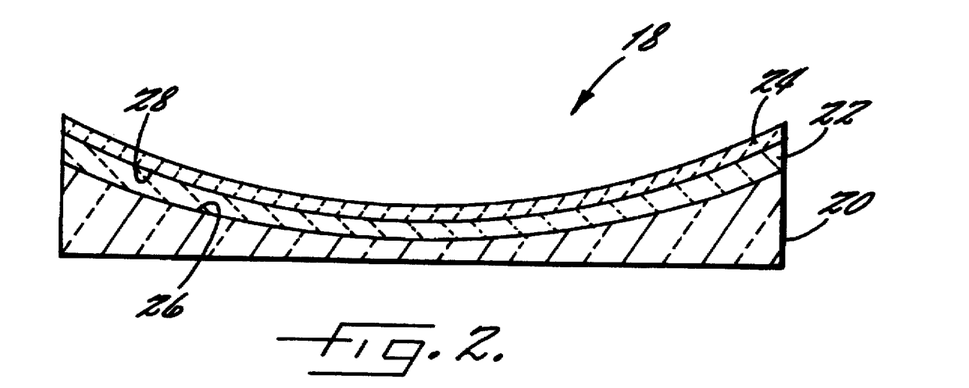
FIG. 2 is a cross-sectional view of an aspheric optical element, such as an aspheric combiner, of one embodiment of the present invention which illustrates the variations in thickness of the aspheric optical element in a radial direction, and in which the thicknesses of the aspheric dielectric layer and the reflection coating have been exaggerated for purposes of illustration.

An exemplary aspheric combiner 18 according to one embodiment of the present invention is shown in cross-section in FIG. 2. As illustrated, the aspheric combiner includes a combiner substrate 20, an aspheric dielectric layer 22 disposed on the combiner substrate and a reflection coating 24 disposed on the aspheric dielectric layer so as to face the pilot. By appropriately fabricating the aspheric combiner, such as according to the coating method and apparatus of the present invention as described below, the aspheric combiner of the present invention can at least partially reflect visual data displayed by the cathode ray tube 12 while correcting for optical aberrations within the heads up display 10 and allowing the pilot to view the outside world in a relatively unobstructed manner.

As shown, the combiner substrate 20 has a first surface 26 with a first predetermined shape. Typically, the first surface of the combiner substrate is slightly concave and has a generally spherical shape in order to provide sufficient optical power to the heads up display 10. In addition, the combiner substrate is generally formed of glass, such as BK-7 optical glass. However, the combiner substrate can have different shapes and can be formed of different materials without departing from the spirit and scope of the present invention.

As illustrated in FIG. 2, the aspheric dielectric layer 22 disposed on the first surface 26 of the combiner substrate 20 has a thickness which varies in a radial direction to create a second surface 28 with a second predetermined shape, different than the first predetermined shape. The second predetermined shape of the aspheric dielectric layer is aspherical due to the variations in thickness of the aspheric dielectric layer in at least one radial direction from the center of the aspheric combiner 18 to an outer edge of the aspheric combiner. While the second surface of the illustrated aspheric combiner is parabolic in shape, the second surface of the aspheric dielectric layer can have other shapes without departing from the spirit and scope of the present invention.

The relative thickness of the aspheric dielectric layer 22 is typically determined by tracing the respective optical paths of various light rays through the heads up display 10 and by forming the aspheric dielectric layer such that each light ray projected by the cathode ray tube 12 travels an equal distance through the heads up display. Thus, the aspheric combiner 18 can compensate for differences in the respective optical paths by increasing or decreasing the relative thickness of the aspheric dielectric layer. Thus, each light ray projected by the cathode ray tube will travel an equal optical path length to the eye of the pilot so as to reduce, if not eliminate, optical aberrations within the heads up display.

As known to those skilled in the art and as described in U.S. Pat. No. 5,293,269 to Gordon H. Burkhart, et al., the contents of which are incorporated by reference herein, the optical path lengths of the light rays emitted by a cathode ray tube 12 are the sum of the optical path length of each segment of the overall optical path traveled by a light ray through the heads up display 10. The optical path length of each segment is, in turn, defined as the refractive index of the material through which the light ray is propagating multiplied by the physical path length of the respective segment. Software is commercially available for computing the respective optical path lengths of a number of light rays through an optical system, such as a heads up display. For example, Sigma 2000 software is available from Kidger Optics of Crowborough, East Suffex, England for performing ray tracing and related computations.

In order to reduce, if not eliminate, reflection loss between the combiner substrate 20 and the aspheric dielectric layer 22, the combiner substrate and the aspheric dielectric layer are preferably formed of materials having first and second predetermined indices of refraction, respectively, which are relatively similar. For example, the first and second predetermined indices of refraction of the combiner substrate and the aspheric dielectric layer, respectively, preferably vary by no greater than 10% and, more preferably, by no greater than 5%. For example, in one advantageous embodiment, the combiner substrate is formed of BK-7 glass having an index of refraction of 1.5176 and the aspheric dielectric layer is formed of silica $SiO_2$ having a index of refraction of 1.47. Alternatively, the aspheric dielectric layer can be formed of a mixture of materials, such as a mixture of $SiO_2$ and $TiO_2$, in order to more closely tailor its index of refraction to match the index of refraction of the substrate.

In addition, while an aspheric dielectric layer 22 having a single dielectric thin film is shown in FIG. 2, the aspheric dielectric layer can be formed of a plurality of aspheric dielectric layers without departing from the spirit and scope of the present invention. For example, a plurality of silica $SiO_2$ layers can be deposited upon the combiner substrate to create a composite aspheric dielectric layer having an overall thickness which varies in a radial direction to compensate or correct for optical aberrations within the heads up display 10 as described above.

The aspheric combiner 18 of the present invention also includes a reflection coating 24 disposed on the second surface 28 of the aspheric dielectric layer 22 as shown in FIG. 2. The reflection coating includes at least one dielectric layer which at least partially reflects light having a wavelength within the predetermined range of wavelengths emitted are projected by the cathode ray tube. For example, for a heads up display 10 having a P-53 cathode ray tube 12 which emits light having wavelengths between about 540 nm and about 560 nm, the reflection coating preferably has at least one dielectric layer which at least partially reflects light having a wavelength between about 540 nm and about 560 nm.

In one embodiment, the reflection coating 24 is formed of a number of alternating dielectric layers having relatively high and relatively low indices of refraction, respectively, in order to at least partially reflect light having a wavelength within the predetermined range of wavelengths of light emitted by the cathode ray tube 12. For example, the reflection coating can be formed of alternating layers of $ZrO_2$ and $TiO_2$ having indices of a refraction of 2.1 and 2.4, respectively, in order to reflect the green light emitted by a P-53 cathode ray tube.

Accordingly, the aspheric combiner 18 of the present invention effectively reflects light emitted by the cathode ray tube 12 while allowing the pilot to continue to view the outside world in a relatively unobstructed manner through the aspheric combiner and the windscreen. However, the aspheric combiner of the present invention also effectively compensates or corrects for optical aberrations within the heads up display 10 due, at least in part, to the aspheric dielectric layer 22 deposited upon the combiner substrate 20.

In addition to the aspheric combiner 18 described above, the present invention also provides a coating method and an associated apparatus for forming an aspheric optical element, such as the aspheric combiner. As shown in cross-section in FIG. 3, the coating apparatus 30 includes a fixture 32 for holding or positioning a mask 34 in a predetermined, at least partially aligned relation from the optical substrate 36, such as the combiner substrate, to be coated. In one embodiment, the optical substrate is also positioned in a predetermined spaced relation from the mask. For example, the optical substrate can be positioned about 2 inches from the mask. However, the mask and the optical substrate can be positioned in other predetermined spaced relations without departing from the spirit and scope of the present invention.

Figure 4A:
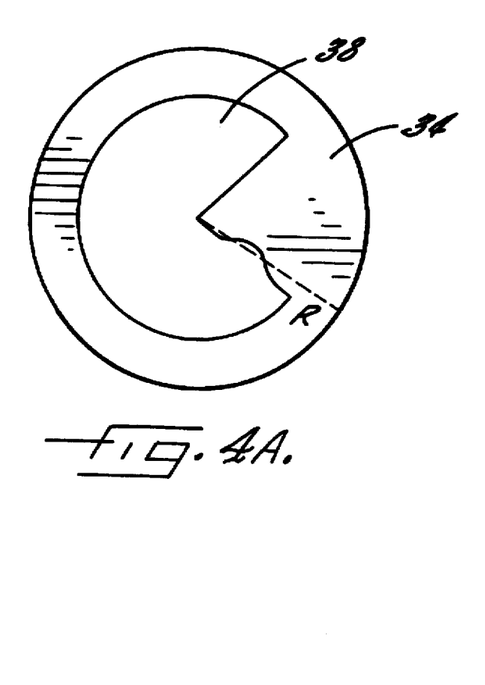
FIGS. 4a and 4b are plan views of two exemplary masks which, at least in part, define the resulting aspheric dielectric layer deposited upon the optical substrate.
Figure 4B:
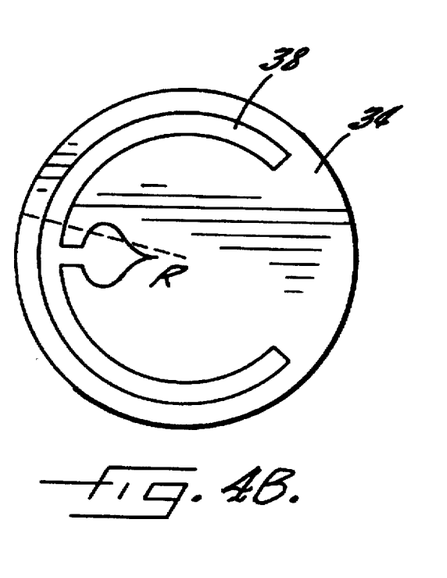

As shown in more detail in FIGS. 4a and 4b, the mask 34 defines an opening 38 having a predetermined shape which varies in at least one radial direction from the center of the mask outward to an outer edge of the mask. While the masks of FIGS. 4a and 4b are examples of typical masks, the mask can have an opening defining a variety of predetermined shapes other than those illustrated without departing from the spirit and scope of the present invention. As illustrated by the radial line R depicted in FIGS. 4a and 4b, the masks have an opening which defines a predetermined shape which varies in at least one and, more typically, several radial directions. As shown, the opening defined by the mask varies in the at least one radial direction by having both open portions and portions which are masked or covered along the same radial line or direction.

Figure 3:
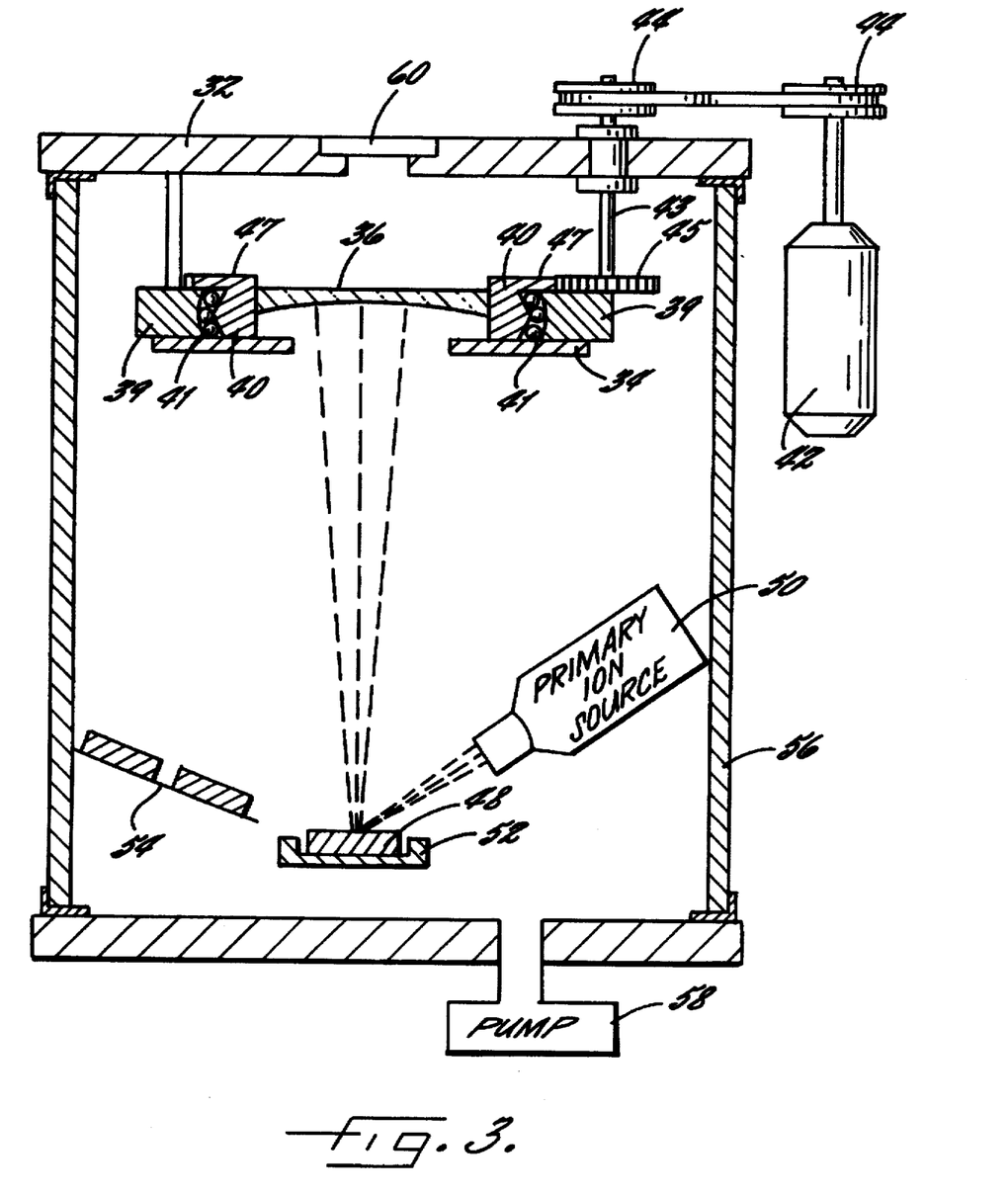
FIG. 3 is a cross-sectional view of a coating apparatus of one embodiment of the present invention which provides for relative rotation between the mask and the optical substrate.

In addition to holding the mask 34 and the optical substrate 36, the fixture 32 preferably positions the mask and the substrate in an aligned relationship. For example, as shown in FIG. 3, the mask can be secured to the fixture, such as by a plurality of fasteners, i.e., brackets, and the optical substrate can be held in a spaced, aligned position relative to the mask, such as within a ring 40 clamped about the edges of the optical substrate to minimize shadowing effects on the optical substrate during the deposition process. The ring, in turn, can be held within a support structure 39. For example, a number of bearings 41, such as ball bearings, can be disposed between the support structure and the ring in order to permit the ring to rotate as described below while the support structure remains fixed in position.

As illustrated in FIG. 3, the coating apparatus 30 also includes rotation means, operatively connected to the fixture 32, for creating a relative rotation between the mask 34 and the optical substrate 36. For example, the rotation means can include a motor 42 which is connected to the fixture and, more particularly, to the ring 40 holding the optical substrate via a series of pulleys 44 in order to rotate the optical substrate while the mask is held in a fixed position. As illustrated, a pulley can be operably connected to a gear 45 via a rod 43. The gear, in turn, can engage or mesh with a number of teeth formed about the upper circumferential edge 47 of the ring. Thus, upon rotation of the pulley by the motor, the gear can be driven, so as to rotate the ring and the optical substrate secured therein.

However, the rotation means could, instead, rotate the mask 34 while holding the optical substrate 36 in a fixed position or could rotate both the mask and the optical substrate either in different directions or in the same direction at different rates of rotation such that a relative rotation is created therebetween without departing from the spirit and scope of the present invention. In addition, the rotation means can include other means of creating a relative rotation between the mask and the optical substrate other than the motor 42 and pulley 44 arrangement illustratively depicted in FIG. 3 without departing from the spirit and scope of the present invention.

The coating apparatus 30 also includes deposition means for depositing an aspheric dielectric layer 22 on the portion of the optical substrate 36 exposed by the opening 38 defined by the mask 34 as the optical substrate and the mark rotate relative to each other. As described above, the aspheric dielectric layer deposited by the deposition means has a thickness which varies in a radial direction in correspondence to the predetermined shape of the opening defined by the mask.

Figure 5:
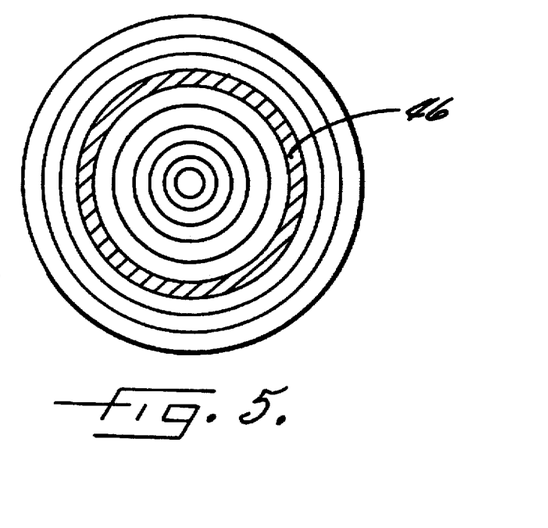
FIG. 5 is a plan view showing a mask divided into a number of ring or annular sections for purposes of illustration.

For purposes of explanation, the mask 34 can be divided into a number of ring or annular sections 46, one of which is shaded for purposes of illustration, as shown in FIG. 5. Due to the relative rotation between the mask and the optical substrate 36, the thickness of the aspheric dielectric layer 22 deposited upon a portion of the optical substrate varies in proportion to the percentage of the corresponding ring of the mask which is open and which is aligned with and overlies that portion of the optical substrate.

Therefore, a thicker aspheric dielectric layer 22 will be deposited upon those portions of the optical substrate 36 which are aligned with and underlie ring sections of the mask 34 which have a greater percentage open, thereby exposing more of the underlying portions of the optical substrate. For example, the outer portions of the aspheric dielectric layer illustrated in FIG. 2 are thicker than other portions of the aspheric dielectric layer. Likewise, a thinner aspheric dielectric layer will be deposited upon those portions of the optical substrate which are aligned with and underlie ring sections of the mask which have a greater percentage closed or masked, thereby exposing less of the underlying portions of the optical substrate. For example, the central portion of the aspheric dielectric layer as shown in FIG. 2 is thinner than other portions of the aspheric dielectric layer.

Due to the relative rotation between the optical substrate 36 and the mask 34, the aspheric dielectric layer 22 deposited upon the substrate is typically rotationally symmetric. In addition, the deposition of the aspheric dielectric layer is generally completed during a predetermined deposition period. Thus, in order to provide this rotational symmetry, the rotation means preferably creates relative rotation between the mask and the optical substrate such that the mask and the optical substrate rotate several revolutions relative to each other and, more preferably, rotate at least 50 revolutions relative to each other within the predetermined deposition period of time.

The coating method and apparatus 30 of the present invention can also form aspheric optical elements, such as aspheric combiners 18, which are not rotationally symmetric. For example, the optical substrate 36 can be mounted or disposed within a carrier or shell during the deposition process. The carrier can then be positioned relative to the mask 34 such that the optical substrate is off-center with respect to the mask. The carrier is preferably comprised of a material, such as stainless steel, which will typically not outgas during the deposition process and has the same generally shape, such as spherical, as the optical element. An aspheric dielectric layer can then be deposited on the surfaces of carrier and the optical substrate which are exposed through the opening 38 defined by the mask. Upon completion of the deposition process, the coated optical element can be removed from the carrier to provide an aspheric optical element which is not rotationally symmetric. Alternatively, a portion, such as a quadrant, of a rotationally symmetric optical element which has been fabricated as described above can be separated from the remainder of the optical element to provide an aspheric optical element which is not rotationally symmetric.

The aspheric dielectric layer 22 can be deposited according to a variety of methods, such as evaporative coating, ion assisted deposition and E-beam deposition, without departing from the spirit and scope of the present invention. In order to deposit the aspheric dielectric layer without significantly heating the optical substrate 36 and, as a result, without creating unnecessary stress between the optical substrate and the aspheric dielectric layer as the aspheric optical element cools, the aspheric dielectric layer is preferably deposited according to ion assisted deposition in one advantageous embodiment.

According to this embodiment in which the aspheric dielectric layer is deposited by ion assisted deposition, the deposition means typically includes a target material 48 and a primary ion source 50 for bombarding the target material with a beam of ions to thereby sputter molecules of the target material on the portion of the optical substrate 36 exposed by the opening 38 defined by the mask 34. For example, the target material, such as silica $SiO_2$, can be disposed within a boat 52 formed of a material, such as a molybdenum, which will not outgas during the deposition process. As known to those skilled in the art and as illustrated schematically in FIG. 2, the coating apparatus 10 and, more particularly, the deposition means can include additional boats 54 filled with target material for replenishing the supply of target material during the deposition process.

In one embodiment, the target material 48 is positioned about 1.5 feet to 2 feet from the mask 34 in order to adequately coat the exposed portions of the substrate 36. However, the target material can be positioned at other distances from the mask without departing from the spirit and scope of the present invention. As known to those skilled in the art, the deposition means can also include a secondary ion source (not shown) for directly bombarding the exposed surface of the optical substrate 36 with ions during the deposition process to eject or remove molecules of the target material which are weakly held or bonded to the substrate.

As shown in cross-section in FIG. 3, the mask 34, the fixture 32 and the deposition means can be disposed within a vacuum chamber 56 to facilitate the deposition of the aspheric dielectric layer 22 upon the optical substrate 36. In this regard, the coating apparatus 30 also generally includes pump means 58, such as a vacuum source, disposed in fluid communication with the vacuum chamber for reducing the pressure within the vacuum chamber during the deposition of the aspheric dielectric layer. Typically, the pump means reduces the pressure within the vacuum chamber to about $10^{-4}$ Torr to about $10^{-5}$ Torr during the deposition process. In order to prevent undesired deposition upon the optical substrate, the components of the coating apparatus within the vacuum chamber are preferably comprised of materials, such as stainless steel, which do not outgas during the deposition process.

The coating apparatus 30 generally includes monitoring means 60 for observing the deposition of the aspheric dielectric layer 22. By monitoring the deposition process, the deposition of the aspheric dielectric layer can be halted once a sufficiently thick dielectric layer has been deposited upon the optical substrate 36. As known to those skilled in the art, the monitoring means can include an optical monitor, such as a monochromator which illuminates the aspheric dielectric layer and which analyzes the light reflected therefrom. By analyzing the power of the reflected light, the thickness of the aspheric dielectric layer can be determined. As an alternative or in addition to the monochromator, the monitoring means can include a crystal monitor which includes a quartz crystal. The quartz crystal is preferably disposed within the vacuum chamber 56 so as to be coated concurrently with the optical substrate. Thus, by monitoring changes in the oscillating frequency of the quartz crystal, the monitoring means can determine the relative thickness of the aspheric dielectric layer.

In order to complete the fabrication of an aspheric combiner 18, a reflection layer 24, typically comprised of one or more dielectric layers, is also deposited upon the aspheric dielectric layer 22 in order to reflect light having a wavelength within the predetermined range of wavelengths of light emitted by the cathode ray tube 12. As described above in conjunction with the aspheric dielectric layer, the coating method and apparatus 30 of the present invention can deposit, such as via ion assisted deposition once the mask 34 has been removed, a reflection coating consisting of a number of dielectric layers having alternating relatively high and relatively low indices of refraction upon the aspheric dielectric layer in order to create the desired narrow band reflectance. Since the mask is removed during this portion of the deposition process, the reflection coating typically has a uniform thickness across the aspheric combiner as shown in FIG. 2.

In addition to aspheric combiners 18, the coating apparatus 30 and method of the present invention can fabricate other types of aspheric optical elements, such as aspheric relay lenses 14 for use in a heads up display 10, in which an aspheric dielectric layer 22 is formed upon and aspherizes an optical substrate 36, such as a glass substrate. During the process of fabricating an aspheric relay lens, however, an anti-reflection layer 24, typically comprised of one or more dielectric layers, is also deposited upon the aspheric dielectric layer in order to minimize reflected light having a wavelength within the predetermined range of wavelengths of light emitted by the cathode ray tube 12. As described above in conjunction with the aspheric dielectric layer, the coating method and apparatus of the present invention can deposit, such as via ion assisted deposition once the mask 34 has been removed, an anti-reflection coating consisting of a number of dielectric layers having alternating relatively high and relatively low indices of refraction upon the aspheric dielectric layer in order to create the desired anti-reflectance properties.

As described above, the coating method and associated apparatus 30 of the present invention can create aspheric optical elements, such as aspheric relay lenses and aspheric combiners 18 for heads up displays 10, in a less expensive manner from relatively inexpensive optical substrates 36, such as spherical substrates. Thus, the aspheric combiner of the present invention can be fabricated in a less costly fashion. However, by controlling the relative thickness of the aspheric dielectric layer 22, the aspheric combiner of the present invention can correct or compensate for optical aberrations within a heads up display. In addition, the aspheric combiner can continue to at least partially reflect the visual data displayed by the cathode ray tube 12 and provide the pilot with a virtually unobstructed view of the outside world.

The invention has been described in considerable detail with reference to preferred embodiments. However, many changes, variations, and modifications can be made without departing from the spirit and scope of the invention as described in the foregoing specification and defined in the appended claims. For example, while the aspheric combiner 18 of the present invention has been described in conjunction with a heads up display 10 for use in an aircraft, the aspheric combiner can be incorporated within other optical systems, such as heads up display systems used for other applications, such as automotive applications, without departing from the spirit and scope of the present invention.

That which is claimed is:

1. A method of coating a combiner substrate to create an aspheric combiner, the method comprising the steps of:

positioning a mask in an aligned relation with the combiner substrate, wherein the mask defines an opening having a shape through which a portion of the combiner substrate is exposed;

rotating at least one of the mask and the combiner substrate to create a relative rotation between the mask and the combiner substrate; and depositing an aspheric dielectric layer on the portion of the combiner substrate exposed by the opening defined by the mask while the mask and the combiner substrate continue their relative rotation, wherein said depositing step comprises depositing an aspheric dielectric layer having a thickness which varies in a radial direction in correspondence to the shape of the opening defined by the mask to thereby create an aspheric combiner.

2. A method according to claim 1 further comprising the step of depositing a reflection coating on the aspheric dielectric layer, wherein said step of depositing a reflection coating comprises depositing at least one dielectric layer on the aspheric dielectric layer which at least partially reflects light having a wavelength within a range of wavelengths.

3. A method according to claim 2 wherein said step of depositing a reflection coating further comprises the step of depositing first and second dielectric layers having first and second indices of refraction, respectively, on the aspheric dielectric layer, wherein the first and second indices of refraction are different such that the reflection coating at least partially reflects light having a wavelength within a range of wavelengths.

4. A method according to claim 1 wherein said depositing step comprises the step of depositing a plurality of aspheric dielectric layers on the portion of the combiner substrate exposed by the opening defined by the mask to create a composite aspheric dielectric layer having a thickness which varies in a radial direction in correspondence to the shape of the opening defined by the mask.

5. A method according to claim 1 wherein said step of creating relative rotation between the mask and the combiner substrate comprises the step of rotating the mask.

6. A method according to claim 1 wherein said step of creating relative rotation between the mask and the combiner substrate comprises the step of rotating the combiner substrate.

7. A method according to claim 1 wherein said depositing step comprises the step of depositing an aspheric dielectric layer during a deposition period, and wherein said step of creating relative rotation between the mask and the combiner substrate comprises the step of creating a relative rotation between the mask and the combiner substrate such that the mask and the combiner substrate rotate at least 50 revolutions relative to each other during the deposition period.

8. A method according to claim 1 wherein said positioning step comprises the step of at least partially aligning the mask with the combiner substrate such that at least a portion of the combiner substrate is exposed through the opening defined by the mask.

9. A method according to claim 1 further comprising the steps of:

disposing the mask and the combiner substrate in a vacuum chamber; and reducing the pressure within the vacuum chamber prior to said depositing step.

10. A method according to claim 1 wherein said depositing step comprises the step of depositing the aspheric dielectric layer via ion assisted deposition.

11. A method according to claim 1 further comprising monitoring the deposition of the aspheric dielectric layer during said depositing step.

12. An apparatus for coating a combiner substrate to create an aspheric combiner, the apparatus comprising:

a mask which defines an opening having a shape which varies in at least one radial direction;

a fixture for holding said mask and the combiner substrate in an aligned relation such that a portion of the combiner substrate is exposed through the opening defined by said mask;

rotation means, operably connected to said fixture, for rotating at least one of said mask and the combiner substrate to create a relative rotation between said mask and the combiner substrate; and deposition means for depositing an aspheric dielectric layer on the portion of the combiner substrate exposed by the opening defined by said mask while said rotation means creates the relative rotation between said mask and the combiner substrate, wherein the aspheric dielectric layer deposited by said deposition means has a thickness which varies in a radial direction in correspondence to the shape of the opening defined by said mask to thereby create an aspheric combiner.

13. An apparatus according to claim 12 further comprising monitoring means for observing the deposition of the aspheric dielectric layer.

14. An apparatus according to claim 13 wherein said monitoring means comprises a monitor selected from the group consisting of monochromators and crystal monitors.

15. An apparatus according to claim 12 wherein said deposition means comprises:

a target material; and an ion source for bombarding said target material with a beam of ions to thereby sputter molecules of said target material on the portion of the combiner substrate exposed by the opening defined by said mask.

16. An apparatus according to claim 12 further comprising:

a vacuum chamber in which said mask, said fixture and said deposition means are disposed; and pump means disposed in fluid communication with said vacuum chamber for reducing the pressure within said vacuum chamber while depositing the aspheric dielectric layer.

17. An apparatus according to claim 12 wherein said rotation means comprises means for rotating the substrate.

18. An aspheric combiner comprising:

a combiner substrate having a first surface with a first shape;

an aspheric dielectric layer disposed on the first surface of said combiner substrate, wherein said aspheric dielectric layer has a thickness which varies in a radial direction to thereby create a second surface with a second shape, different than the first shape; and a reflection coating disposed on the second surface of said aspheric dielectric layer, wherein said reflection coating is comprised of at least one dielectric layer which at least partially reflects light having a wavelength within a range of wavelengths.

19. An aspheric combiner according to claim 18 wherein said reflection coating comprises first and second dielectric layers having first and second indices of refraction, respectively, and wherein the first and second indices of refraction are different such that the reflection coating at least partially reflects light having a wavelength within a range of wavelengths.

20. An aspheric combiner according to claim 19 wherein said first dielectric layer is comprised of $ZrO_2$, and wherein said second dielectric layer is comprised of $TiO_2$.

21. An aspheric combiner according to claim 18 wherein said aspheric dielectric layer comprises a plurality of aspheric dielectric layers on the portion of the combiner substrate exposed by the opening defined by the mask to thereby create a composite aspheric dielectric layer having a thickness which varies in a radial direction.

22. An aspheric combiner according to claim 18 wherein said combiner substrate and said aspheric dielectric layer have first and second indices of refraction, respectively, and wherein the first and second indices of refraction vary by no greater than 10%.

23. An aspheric combiner according to claim 22 wherein said combiner substrate is comprised of BK-7 glass, and wherein said aspheric dielectric layer is comprised of $SiO_2$.

24. An aspheric combiner according to claim 18 wherein the first surface of said combiner substrate is spherical in shape.

25. A method of coating an optical substrate to create an aspheric optical element, the method comprising the steps of:

positioning a mask in an aligned relation with the optical substrate, wherein the mask defines an opening having a shape through which a portion of the optical substrate is exposed;

rotating at least one of the mask and the optical substrate to create a relative rotation between the mask and the optical substrate; and depositing an aspheric dielectric layer on the portion of the optical substrate exposed by the opening defined by the mask while the mask and the optical substrate continue their relative rotation, wherein said depositing step comprises depositing an aspheric dielectric layer having a thickness which varies in a radial direction in correspondence to the shape of the opening defined by the mask to thereby create an aspheric optical element.

26. A method according to claim 25 wherein said depositing step comprises the step of depositing a plurality of aspheric dielectric layers on the portion of the optical substrate exposed by the opening defined by the mask to thereby create a composite aspheric dielectric layer having a thickness which varies in a radial direction in correspondence to the shape of the opening defined by the mask.

27. A method according to claim 25 wherein said step of creating relative rotation between the mask and the optical substrate comprises the step of rotating the mask.

28. A method according to claim 25 wherein said step of creating relative rotation between the mask and the optical substrate comprises the step of rotating the optical substrate.

29. A method according to claim 25 wherein said depositing step comprises the step of depositing an aspheric dielectric layer during a deposition period, and wherein said step of creating relative rotation between the mask and the optical substrate comprises the step of creating a relative rotation between the mask and the optical substrate such that the mask and the optical substrate rotate at least 50 revolutions relative to each other within the deposition period.

30. A method according to claim 25 wherein said positioning step comprises disposing the optical substrate within a carrier such that at least a portion of the optical substrate is exposed through the opening defined by the mask, and wherein said method further comprises the step of removing the optical substrate from the carrier following said depositing step.

31. A method according to claim 25 wherein said positioning step comprises the step of at least partially aligning the mask with the optical substrate such that at least a portion of the optical substrate is exposed through the opening defined by the mask.

32. A method according to claim 25 further comprising the steps of:

disposing the mask and the optical substrate in a vacuum chamber; and reducing the pressure within the vacuum chamber prior to said depositing step.

33. A method according to claim 25 wherein said depositing step comprises the step of depositing the aspheric dielectric layer via ion assisted deposition.

34. A method according to claim 25 further comprising the step of monitoring the deposition of the aspheric dielectric layer during said depositing step.

35. An apparatus for coating an optical substrate to create an aspheric optical element, the apparatus comprising:

a mask which defines an opening having a shape which varies in at least one radial direction;

a fixture for holding said mask and the optical substrate in an aligned relation such that a portion of the optical substrate is exposed through the opening defined by said mask;

rotation means, operably connected to said fixture, for rotating at least one of said mask and the optical substrate to create a relative rotation between said mask and the optical substrate; and deposition means for depositing an aspheric dielectric layer on the portion of the optical substrate exposed by the opening defined by said mask while said rotation means creates the relative rotation between said mask and the optical substrate, wherein the aspheric dielectric layer deposited by said deposition means has a thickness which varies in a radial direction in correspondence to the shape of the opening defined by said mask to thereby create an aspheric optical element.

36. An apparatus according to claim 35 further comprising monitoring means for observing the deposition of the aspheric dielectric layer.

37. An apparatus according to claim 35 wherein said deposition means comprises:

a target material; and an ion source for bombarding said target material with a beam of ions to thereby sputter molecules of said target material on the portion of the combiner substrate exposed by the opening defined by said mask.

38. An apparatus according to claim 35 further comprising:

a vacuum chamber in which said mask, said fixture and said deposition means are disposed; and pump means, disposed in fluid communication with said vacuum chamber, for reducing the pressure within said vacuum chamber while depositing the aspheric dielectric layer.

39. An aspheric optical element fabricated according to a coating process comprising the steps of:

positioning a mask in an aligned relation with an optical substrate, wherein the mask defines an opening having a shape through which a portion of the optical substrate is exposed;

rotating at least one of the mask and the optical substrate to create a relative rotation between the mask and the optical substrate; and depositing an aspheric dielectric layer on the portion of the optical substrate exposed by the opening defined by the mask while the mask and the optical substrate continue their relative rotation, wherein said depositing step comprises depositing an aspheric dielectric layer having a thickness which varies in a radial direction in correspondence to the shape of the opening defined by the mask to thereby create an aspheric optical element.

40. An aspheric optical element fabricated according to the coating process of claim 39 wherein said depositing step comprises the step of depositing a plurality of aspheric dielectric layers on the portion of the optical substrate exposed by the opening defined by the mask to thereby create a composite aspheric dielectric layer having a thickness which varies in a radial direction in correspondence to the shape of the opening defined by the mask.

41. An aspheric optical element fabricated according to the coating process of claim 39 wherein said depositing step comprises the step of depositing an aspheric dielectric layer during a deposition period, and wherein said step of creating relative rotation between the mask and the optical substrate comprises the step of creating a relative rotation between the mask and the optical substrate such that the mask and the optical substrate rotate at least 50 revolutions relative to each other within the deposition period.

42. An aspheric optical element fabricated according to the coating process of claim 39 wherein said positioning step comprises the step of at least partially aligning the mask with the optical substrate such that at least a portion of the optical substrate is exposed through the opening defined by the mask.

43. An aspheric optical element fabricated according to the coating process of claim 39 wherein said depositing step comprises the step of depositing the aspheric dielectric layer via ion assisted deposition.

44. An aspheric optical element fabricated according to the coating process of claim 39 wherein said positioning step comprises disposing the optical substrate within a carrier such that at least a portion of the optical substrate is exposed through the opening defined by the mask, and wherein said coating process further comprises the step of removing the optical substrate from the carrier following said depositing step.

* * * * *